United States Patent [19]
Jeon

[11] Patent Number: 6,097,928
[45] Date of Patent: Aug. 1, 2000

[54] METHOD FOR SELECTING A CONTROL CHANNEL IN A TRUNKED RADIO SYSTEM

[75] Inventor: Bong Shin Jeon, Kyungki-do, Rep. of Korea

[73] Assignee: LG Information & Communications, Ltd., Seoul, Rep. of Korea

[21] Appl. No.: 08/948,460

[22] Filed: Oct. 10, 1997

[30] Foreign Application Priority Data

Nov. 10, 1996 [KR] Rep. of Korea ................ 96-45244

[51] Int. Cl.[7] ........................................... H04B 1/74
[52] U.S. Cl. ........................................ 455/8; 455/515
[58] Field of Search ........................ 455/8, 515, 434, 455/450, 518

[56] References Cited

U.S. PATENT DOCUMENTS

| | | | |
|---|---|---|---|
| 4,360,927 | 11/1982 | Bowen | 455/17 |
| 4,870,408 | 9/1989 | Zdunek et al. | |
| 5,040,237 | 8/1991 | Barnes | 455/8 |
| 5,086,506 | 2/1992 | Hall | 455/8 |
| 5,093,926 | 3/1992 | Sasuta | 455/33 |
| 5,125,103 | 6/1992 | Grube | 455/34 |
| 5,175,866 | 12/1992 | Childress | 455/8 |
| 5,404,573 | 4/1995 | Yabe | 455/33.1 |
| 5,606,548 | 2/1997 | Vayrynen | 370/252 |

Primary Examiner—Daniel S. Hunter
Assistant Examiner—Nick Corsaro
Attorney, Agent, or Firm—Fleshner & Kim, LLP

[57] ABSTRACT

A method for selecting a control channel in a trunked radio system having a number of control channels and radio unit groups corresponding to the control channels, including the following steps of: executing a communication by one radio unit group among a number of radio unit groups through a previously designated primary control channel among a number of control channels; and executing the communication by the radio unit group through one control channel among other control channels which are operated normally, when the previously designated primary control channel has a fault.

24 Claims, 6 Drawing Sheets

METHOD FOR SELECTING A CONTROL CHANNEL IN A TRUNKED RADIO SYSTEM

BACKGROUND OF THE INVENTION

1. Field of the Invention

The present invention relates to trunked radio systems, and more particularly, to a method for selecting a control channel in a trunked radio system, in which a fault control channel retained by a group of radio units is changed into an arbitrary normal control channel selected among normal control channels, to continually execute a communication service.

2. Background of the Related Art

Generally, a trunked radio system is comprised of a plurality of repeaters which correspond to a plurality of control channels, a repeater control unit which controls the plurality of repeaters, and a repeater management station which monitors the repeater control unit. Each of the repeaters is operated by transmitting/receiving a control signal to/from a plurality of radio units such as a personal portable unit, a vehicle unit and so on.

FIG. 1 is a block diagram illustrating a construction of a conventional trunked radio system. In a conventional trunked radio system, there are provided a plurality of control channel repeaters 11-1, 11-2, ..., 11-N which are connected in parallel with a repeater control unit (RCU) 10 via a common data bus 12, in which the repeater 11-N is allotted as a stand-by control channel repeater. Each of the control channel repeaters is constructed to generate a frequency in a phase locked loop manner. It is accordingly possible to select and fix all frequencies allotted in the trunked radio system. A reference numeral 13 indicates a repeater management station, and reference numerals 14, 15, ..., and 18 each represent unit groups having radio units corresponding to the control channel repeaters 11-1 to 11-N.

In a method of the conventional control channel selection, a single stand-by control channel is additionally prepared for a predetermined number of control channels in preparation for the failure of the control channel repeaters. The stand-by control channel is normally in a stand-by state, but if failure on the control channel during operation occurs, it operates for the fault control channel.

Then, when the fault control channel is repaired, the stand-by control channel returns to the stand-by state and the repaired control channel is operated for communication service.

FIG. 2 is a block diagram illustrating another construction of a conventional trunked radio system. The construction of FIG. 2 is the same as that of FIG. 1 except for the stand-by control channel of FIG. 1. In other words, the construction of FIG. 2 does not include the stand-by control channel. In accordance with FIG. 2, each unit group has a primary control channel and a secondary control channel. For example, if the repeater 21-1 is designated as the primary control channel repeater of the unit group 24, the repeater 21-2 is designated as the secondary control channel repeater. A communication service is executed by transmitting/receiving a control signal through the primary control channel (e.g. CH1) of the unit group 24, and if the primary control channel is in a fault state, all radio units 24-1, 24-2, ..., 24-M contained in the unit group 24 that use the primary control channel change their control channel to the secondary control channel (e.g. CH2) of the secondary control channel repeater 21-2, respectively. Then, the radio unit group 24 transmits/receives the control signal to/from the secondary control channel repeater 21-2 to continually execute the communication service in a corresponding site. A method for selecting a control channel in the conventional trunked radio system of FIG. 1 will be in detail discussed.

It is assumed that the repeater 11-1 was previously designated as transmitting the primary control channel of the radio unit group 14. When the radio unit group 14 is in a stand-by state, all of the radio units 14-1, 14-2, ..., 14-M of the radio unit group 14 receive a forward signal transmitted from the repeater 11-1 as the primary control channel.

Since the forward signal contains a current site number which is used by the radio unit group, and information on all the control channels and repeaters which are available, the radio units 14-1, 14-2, ..., 14-M can check their own locations with the information and store an available channel number which can be used during transmission. At this time, if the radio unit 14-1 is removed from its current site, since it does not receive the forward signal from the primary control channel repeater 11-1, the radio unit tries to roam. However, if the radio unit 14-1 does not receive the forward signal in the stand-by state while it is not removed from its current site then a failure on the primary control channel for the repeater 11-1 is generated at the radio units 14-1. If it is determined that the control channel repeater 11-1 is in a fault state, the repeater control unit 10 transmits information such as a channel number on the fault repeater, here 11-1, to the stand-by repeater 11-N, to continually execute the operation previously performed by the fault repeater 11-1.

Thereafter, the stand-by repeater 11-N operates a phase locked loop circuit contained therewithin on the basis of the information transmitted from the repeater control unit 10 and fixes its channel number to CH. 1, which is the same as the fault repeater 11-1, instead of its original channel number, CH. N. As a result, since the standby repeater 11-N executes the normal operations in place of the fault repeater 11-1, the radio units 14-1, 14-2, ..., 14-M of the radio unit group 14, which have the fault repeater 11-1 as their primary control channel, are continually under the communication service.

Now, a method for use of the control channels in the conventional trunked radio system of FIG. 2 will be discussed in detail. FIG. 3 is a block diagram illustrating a detailed construction of the repeater control unit 20, the repeater 21-1 and the radio unit 24-1 of FIG. 2.

As shown in FIG. 3, the repeater control unit 20 is comprised of a system controller 20a, a memory 20b and a signal processing part 20c, and is connected to the repeater management station 23. The control channel repeater 21-1 includes a system controller 21-1a, a memory 21-1b, a signal processing part 21-1c and a signal transmitting/receiving part 21-1d. The signal processing part 21-1c is connected to the signal processing part 20c of the repeater control unit 20 via a data bus 22. The radio unit 24-1 is comprised of an antenna 24-1a, a signal transmitting/receiving part 24-1b, a signal processing part 24-1c, a memory 24-1d and a system controller 24-1e. The signal transmitting/receiving part 21-1d of the repeater 21-1 transmits/receives wireless signals from/to the signal transmitting/receiving part 24-1b of the radio unit 24-1. The other repeaters and radio units shown in FIG. 2 have the same construction as the above.

For instance, it is assumed that the primary control channel of the radio unit group 24 is designated as originating from the repeater 21-1 and the secondary control channel thereof is designated as originating from the repeater 21-2. When the radio unit 24-1 is in a stand-by state, the radio unit 24-1 receives the forward signal transmitted from the repeater 21-1 as the primary control channel. As previously described, since the forward signal contains the current site number and information on the channel numbers CH, CH. 1, CH. N of all control channels or repeaters which are available, the radio unit 24-1 can check its own location with the information, and store the available channel number which can be used during transmission.

If the repeater 21-1, having the primary control channel, is in a fault state, and if the radio unit 24-1 does not receive the forward signal from the repeater 21-1, the radio unit 24-1 fixes to the channel number CH. 2, which corresponds to the channel of the repeater 21-2, as the secondary control channel in lieu of its primary control channel number CH. 1, before trying to roam, and checks whether a forward signal is received from the repeater 21-2. If the secondary control channel is in a normal operation mode, since the radio unit 24-1 receives the forward signal from the repeater 21-2, the radio unit 24-1 will receive all control signals through the secondary control channel of repeater 21-2, without executing the roaming process.

In the same manner as the above, other radio unit groups 25 to 28 can communicate through their respective secondary control channels, when their primary control channels are in a fault state.

However, the above methods of the conventional trunked radio systems have the following disadvantages: first, in the construction of FIG. 1, since the stand-by control channel repeater, which is additionally disposed, is always in a stand-by state, without being used, an efficiency of the control channels is reduced. Furthermore, since the additional stand-by control channel repeater and control channel are required, a production cost of the system is accordingly increased. Moreover, in the case where two or more control channel repeaters are at a fault state or the stand-by control channel repeater is in a fault state, since the stand-by control channel repeater can not execute the operation of the additional fault control channel or channels, the performance of the system is accordingly degraded. In this case, the radio unit group which selects the fault repeater for the primary control channel can not be used until the fault repeater is repaired and replaced manually. On the other hand, in the construction of FIG. 2, in the case where both of the primary control channel repeater and the secondary control channel repeater, which are designated for the radio unit group, are in a fault state, the corresponding radio units can not be used until the fault control channel repeaters are repaired and replaced manually.

SUMMARY OF THE INVENTION

Accordingly, the present invention is directed to a method for selecting a control channel in a trunked radio system that substantially obviates one or more of the problems due to limitations and disadvantages of the related art.

An object of the invention is to provide a method for selecting control channels in a trunked radio system which can effectively use the control channels, without having an additional stand-by control channel.

To accomplish this and other objects of the present invention, a method for selecting a plurality of control channels in a trunked radio system having the plurality of control channels and a plurality of radio unit groups corresponding to the control channels includes the steps of: executing a communication by any one unit group among the plurality of radio unit groups through a previously designated primary control channel among the plurality of control channels; and executing a communication by the unit group through any one control channel among the another control channels which are operated normally, when the previously designated primary control channel has a fault.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF PREFERRED EMBODIMENTS

Reference will now be made in detail to the preferred embodiments of the present invention, examples of which are illustrated in the accompanying drawings.

Figure 4A:
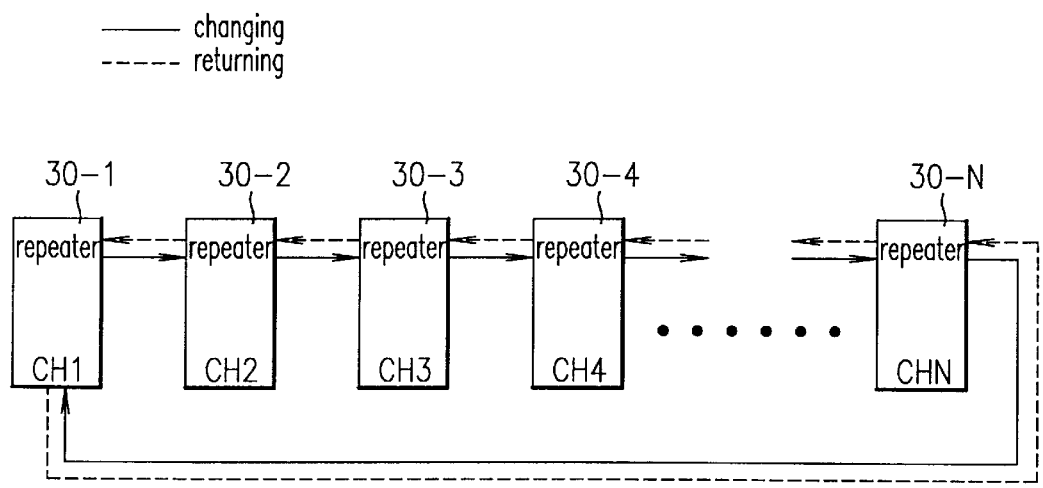
FIG. 4A is a diagram illustrating an embodiment of a changing and returning procedure of a fault control channel made according to the present invention.
Figure 4B:
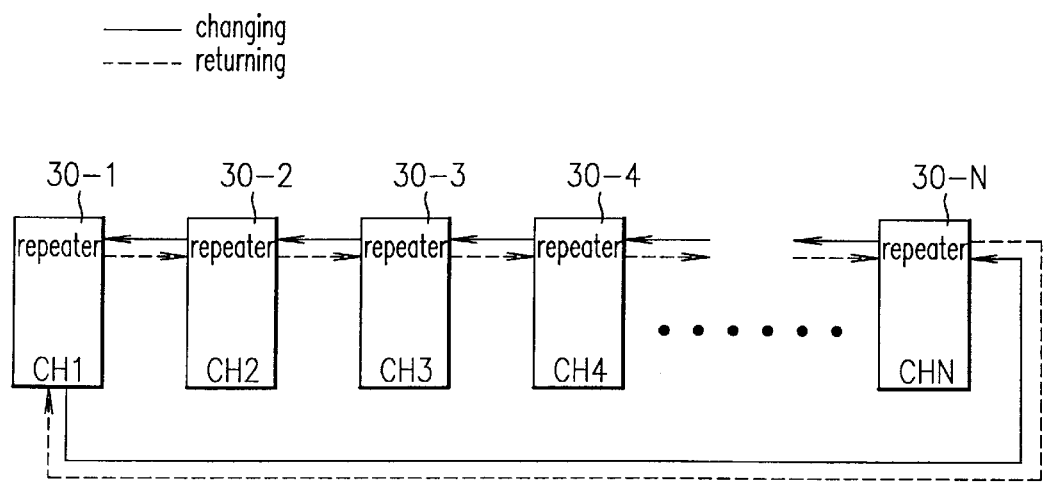
FIG. 4B is a diagram illustrating another embodiment of a changing and returning procedure of a fault control channel made according to the present invention.

FIG. 4A is a diagram illustrating an embodiment of a changing and returning procedure of a fault control channel made according to the present invention and FIG. 4B is a diagram illustrating another embodiment of a changing and returning procedure of a fault control channel made according to the present invention. Referring to FIG. 4A, the control channel has its channel number changed from a low channel number to a high channel number and contrarily returns its channel number from the high channel to the low channel number. In other words, when a repeater 30-1, having the channel number CH. 1, has a fault state, the radio units having the repeater 30-1 as the primary control channel change their channel numbers to the channel number CH. 2 of the repeater 30-2 to execute communication service. However, if even the repeater 30-2 is in a fault state, the radio units change their primary control channel to the channel of repeater 30-3. When the control channel is the repeater having the fault state, the change procedure is made in order from the control channel having the low channel number to the control channel having the high channel number. Therefore, when the original primary control channel is repaired, a returning procedure is made in order from the control channel having the high channel number to the control channel having the low channel number. The changing and returning procedures of the control channel of FIG. 4B is opposite to that of FIG. 4A.

Figure 5A:
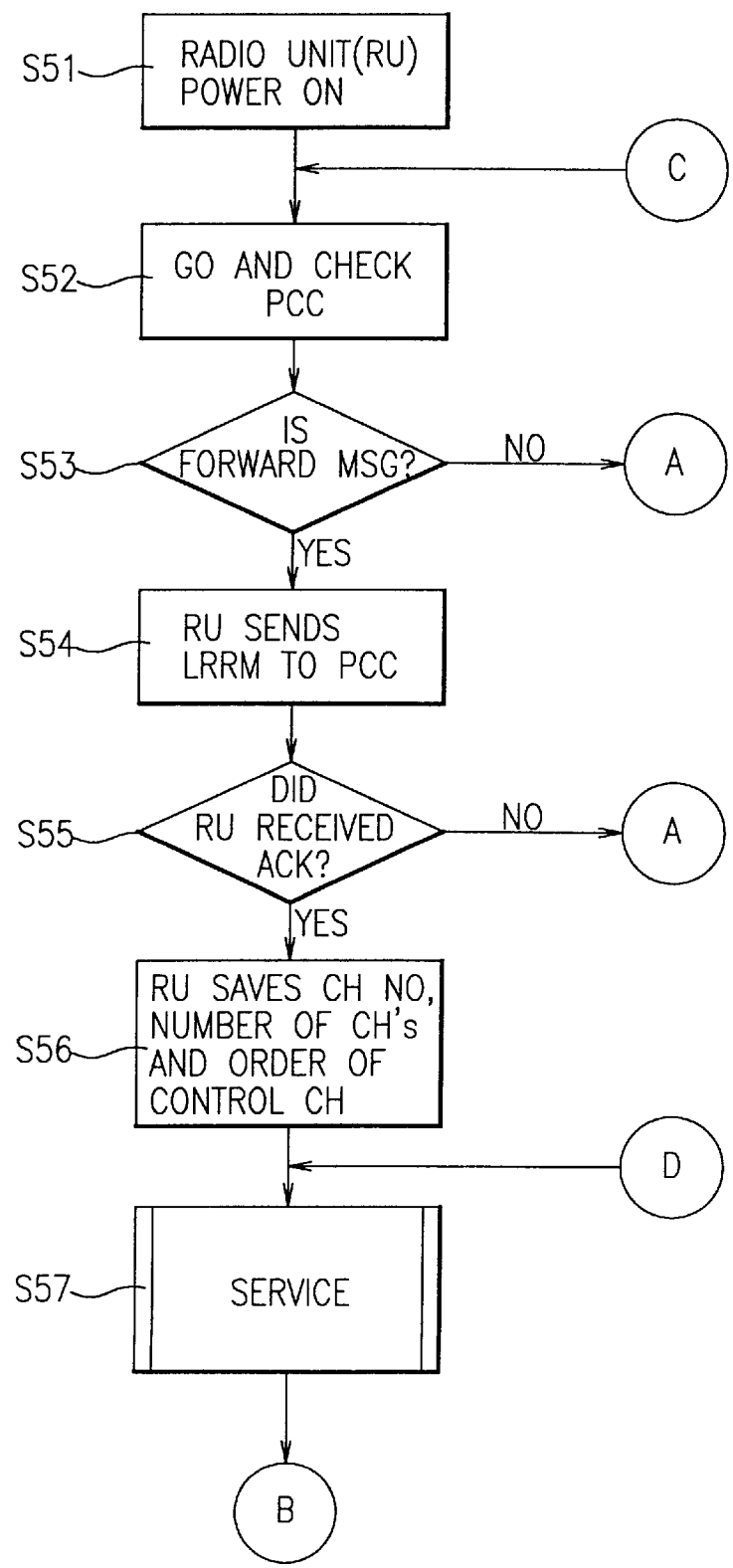
FIGS. 5A and 5B are flowcharts illustrating an embodiment of a use method of control channels according to the present invention.
Figure 5B:
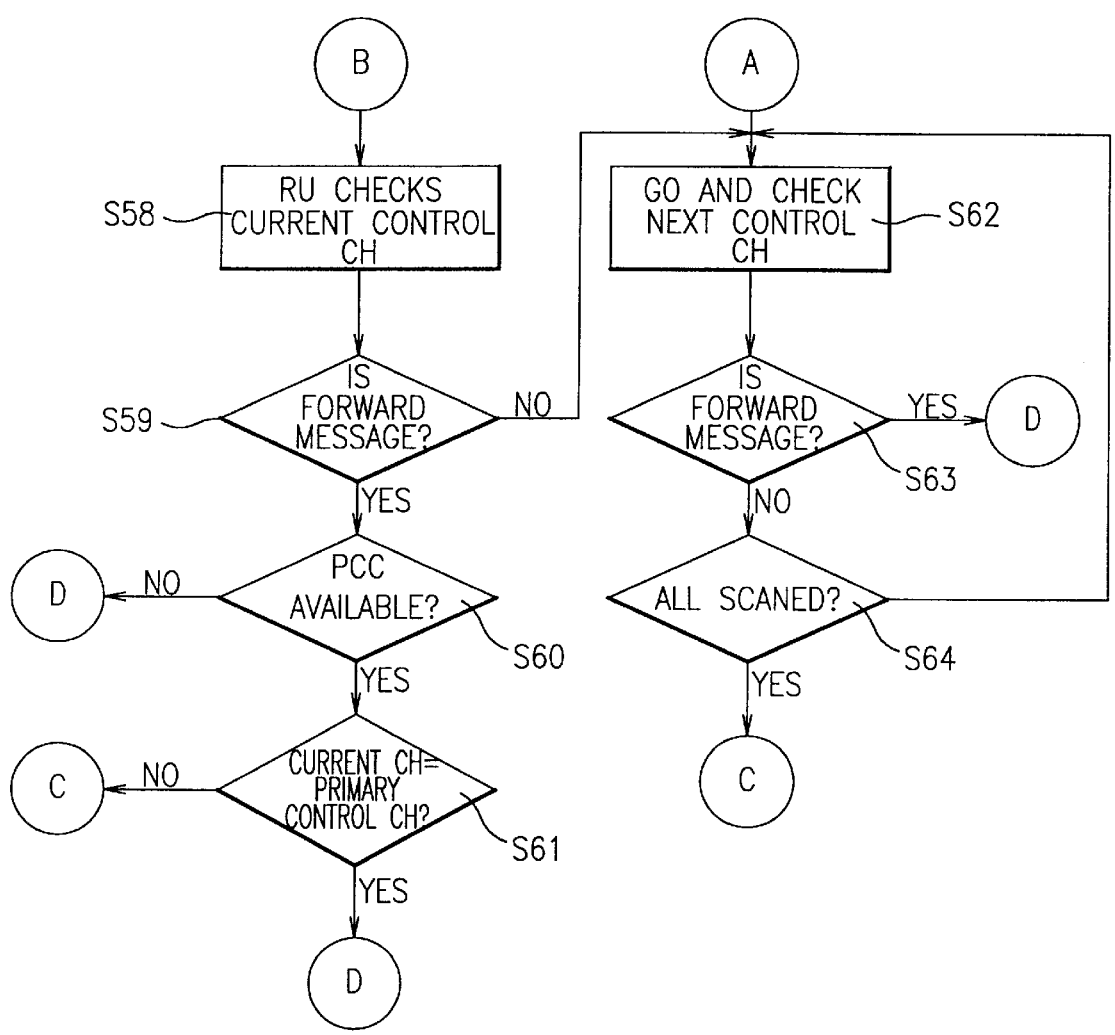

FIGS. 5A and 5B are flowcharts illustrating an embodiment of a method for use of control channels according to the present invention. An explanation of the embodiment of FIGS. 5A and 5B will be discussed with reference to FIGS. 2 and 3.

It is assumed that the primary control channel repeater of the radio unit group 24 is designated as the repeater 21-1. As shown in FIG. 5A, the radio unit group 24 is powered on by a user, at step S51, and at a stand-by state the radio unit group 24 receives the forward signal from the primary control channel repeater 21-1. Since the forward signal contains the current site number and the channel numbers of all control channels which are available, the radio unit 24-1 can check its own location with the information and store the free channel number which can be used during transmission.

After the radio unit 24-1 is powered on, the system controller 24-1e checks whether the primary control channel repeater 21-1 is operating normally by a system program stored in the memory 24-1d, at step S52. Next, at step S53 the system controller 24-1e checks whether the forward signal is received from the primary control channel repeater 21-1. If the forward signal is received, the radio unit 24-1 transmits a location registration request signal (LRRM) to the primary control channel repeater 21-1 at step S54. At the time, if the primary control channel repeater 21-1 is operating normally, the primary control channel repeater 21-1 responds to the location registration request signal and sends an acknowledging message and information on all of the control channels to the radio unit 24-1. At step S55, the system controller 24-1e of the radio unit 24-1 checks whether the acknowledging message is received through the signal transmitting/receiving part 24-1b. If the acknowledging message is received, the radio unit 24-1 stores the information received along with the acknowledging message, that is, the channel number of the repeater being currently used, the total number of control channels and the fixed channel number of each control channel, in the memory 24-1d. At step S56, the system controller 24-1e of the radio unit 24-1 stores the information, in order from the repeaters having the low channel number to the repeaters having the high channel number, or, in order from the repeaters having the high channel number to the repeaters having the low channel number. After storing the information, then at step S57, the communication service between the repeater control unit 20, the primary control channel repeater 21-1 and the radio unit 24-1, is executed by the system programs of the memories 20b, 21-1b and 24-1d. During the execution of the communication service, at step S58, the radio unit 24-1 checks an operation state of the control channel repeater being currently used. Then, at step S59, the radio unit 24-1 checks whether the forward signal is received from the current control channel repeater. If the forward signal is received, then at step S60, the system controller 24-1e of the radio unit 24-1 checks whether the primary control channel repeater 21-1 is available. If available, the system controller 24-1e of the radio unit 24-1 checks whether the channel number of the current control channel corresponds to that of the primary control channel, at step S61. If it is checked that the channel numbers correspond with each other, the communication service at the step S57 is continually executed through the primary control channel repeater 21-1.

If the forward signal is not received from the primary control channel repeater 21-1 at the steps S53 and S59, the radio unit 24-1 determines that the primary control channel repeater 21-1 is in a fault state and, at step S62, checks the control channel having a higher or lower channel number than the primary control channel. In other words, if the forward signal is not received from the primary control channel repeater 21-1, even in the state where the radio unit 24-1 is not removed from the corresponding site, it means that the primary control channel repeater 21-1 is in a fault state. As mentioned in the above, when the primary control channel repeater is in a fault state, any one of the control channel repeaters, which is contained in the corresponding site and is operating normally, can be used in place of the faulted primary control channel repeater. Accordingly, when the previously designated primary control channel repeater is in a fault state, it is determined that the control channel repeater having the lower channel number than the fault primary control channel will be checked or the control channel repeater having the higher channel number than the fault primary control channel will be checked by the system programs of the memories 20b, 21-1b and 24-1d. In more detail, in the case where the previously designated primary control channel repeater is in a fault state, the radio unit checks an operation state of another control channel repeater, in a previously determined sequence set by the system program, before roaming.

At this time, the radio unit selects a control channel repeater which is acknowledged as having the normally operating control channel in place of the faulted primary control channel repeater. That is, if the adjacent control channel repeater having the higher channel number than the faulted primary control channel repeater is normally operated, then the radio unit does not execute the roaming and transmits/receives all control signals from/to the selected adjacent control channel repeater.

For example, at the step S62, if the primary control channel repeater 21-2 designated in the radio unit 25-1 is in a fault state, the radio unit 25-1 checks whether the control channel repeater 21-3 having the higher channel number than the faulted primary control channel repeater 21-2, between the adjacent control channel repeaters 21-1 and 21-3, of the faulted primary control channel repeater 21-2, is operating normally. Next, at step S63 the radio unit 25-1 checks whether the forward signal is received from the control channel repeater 21-3. If received, the system program returns to the step S57 for the communication service through the control channel repeater 21-3. However, if the foward signal is not received, it is determined that the control channel repeater 21-3 is in a fault state and the system program returns to the step S62, to check whether the next control channel repeater 21-4 is operating normally. At step S64, it is checked whether the operation states of all of the control channel repeaters 21-1, 21-2, . . . , 21-N are scanned. If not scanned, the system program returns to the step S62 to check whether the next control channel repeater is operating normally. In other words, when the primary control channel repeater 21-2 of the radio unit 25-1 is in a fault state, the system program checks whether the next control channel repeaters 21-3, 21-4, . . . , 21-N are operating normally until one control channel repeater, that is operating normally, is selected.

Figure 1:
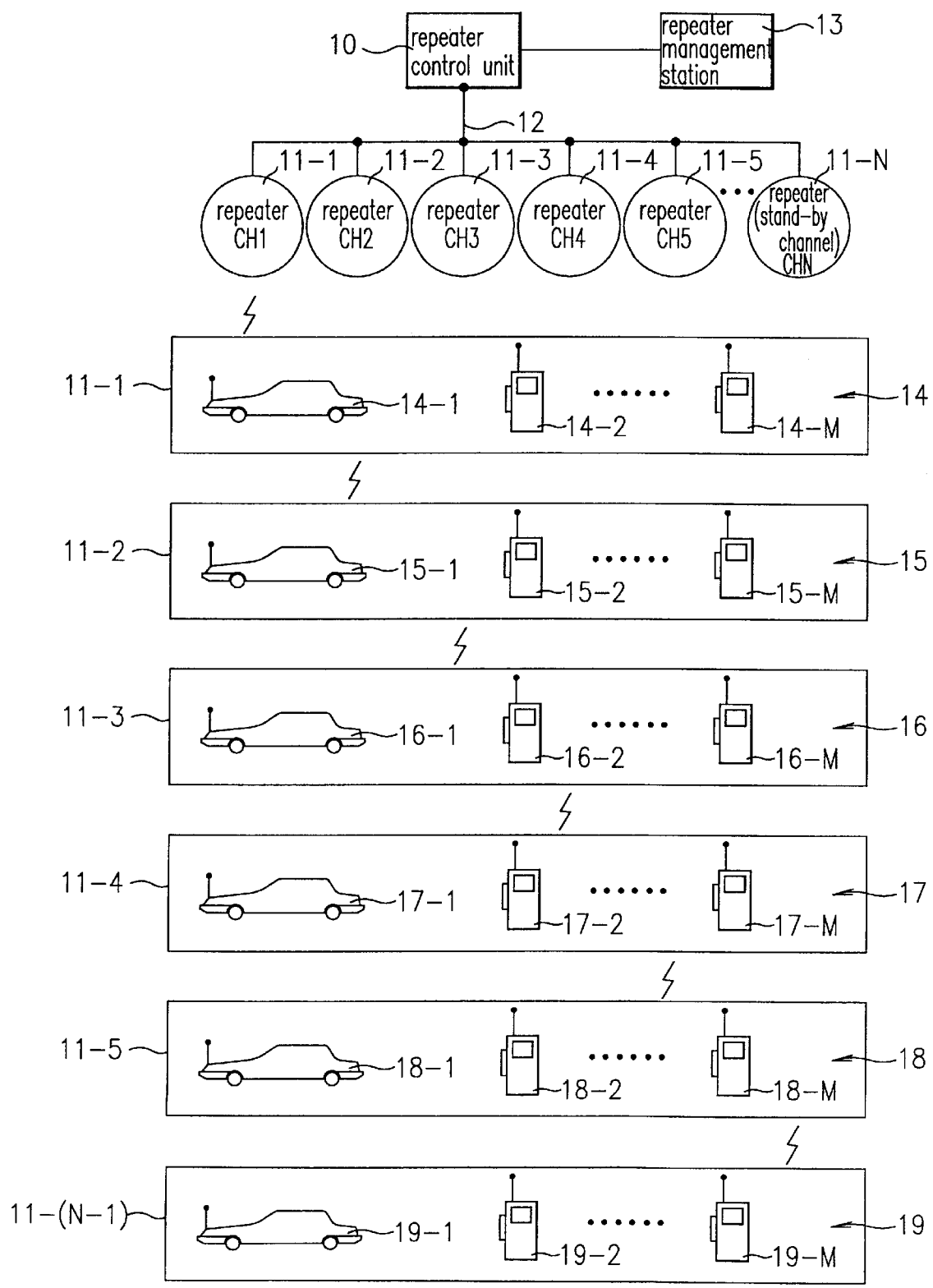
FIG. 1 is a block diagram illustrating a construction of a conventional trunked radio system.
Figure 2:
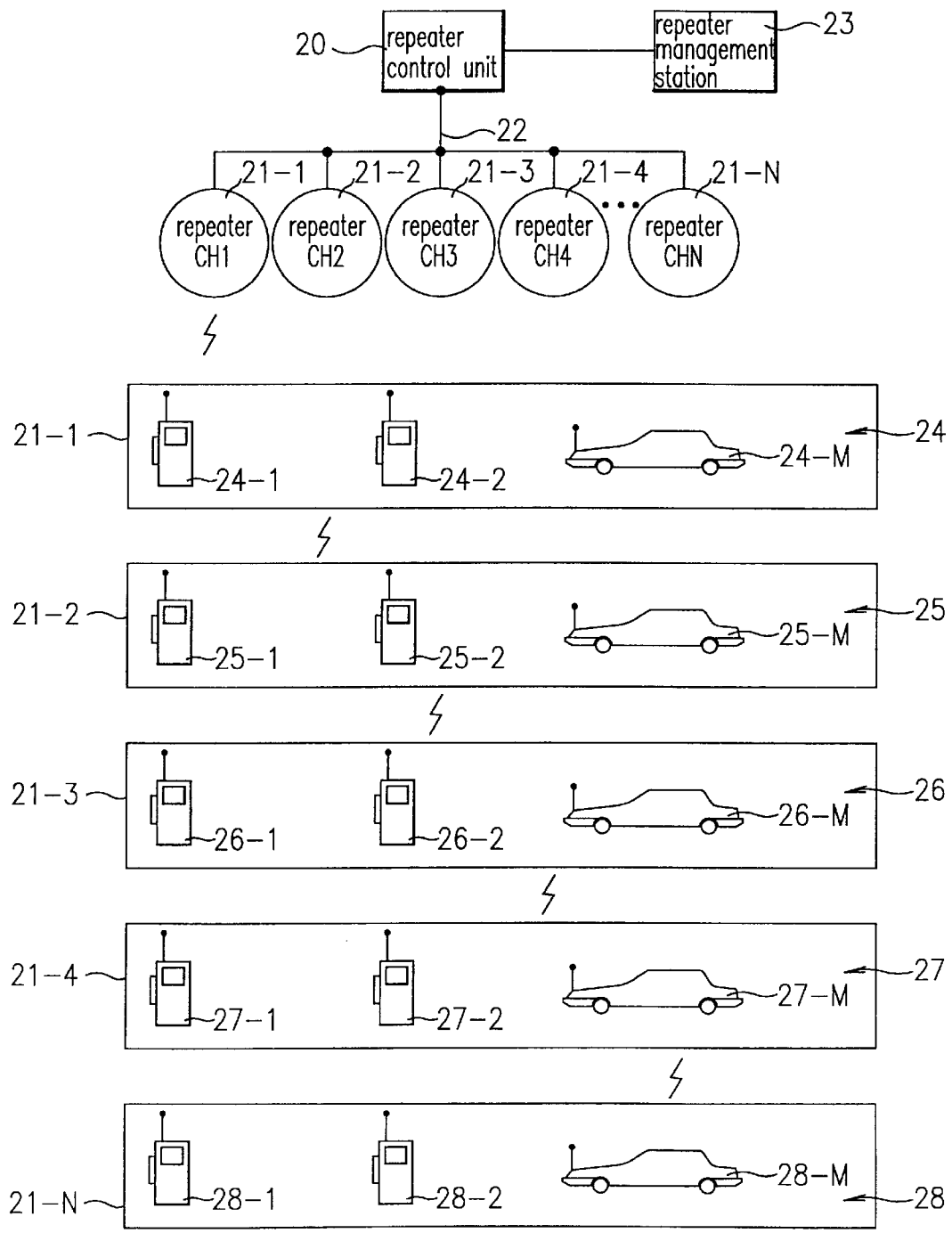
FIG. 2 is a block diagram illustrating another construction of a conventional trunked radio system.
Figure 3:
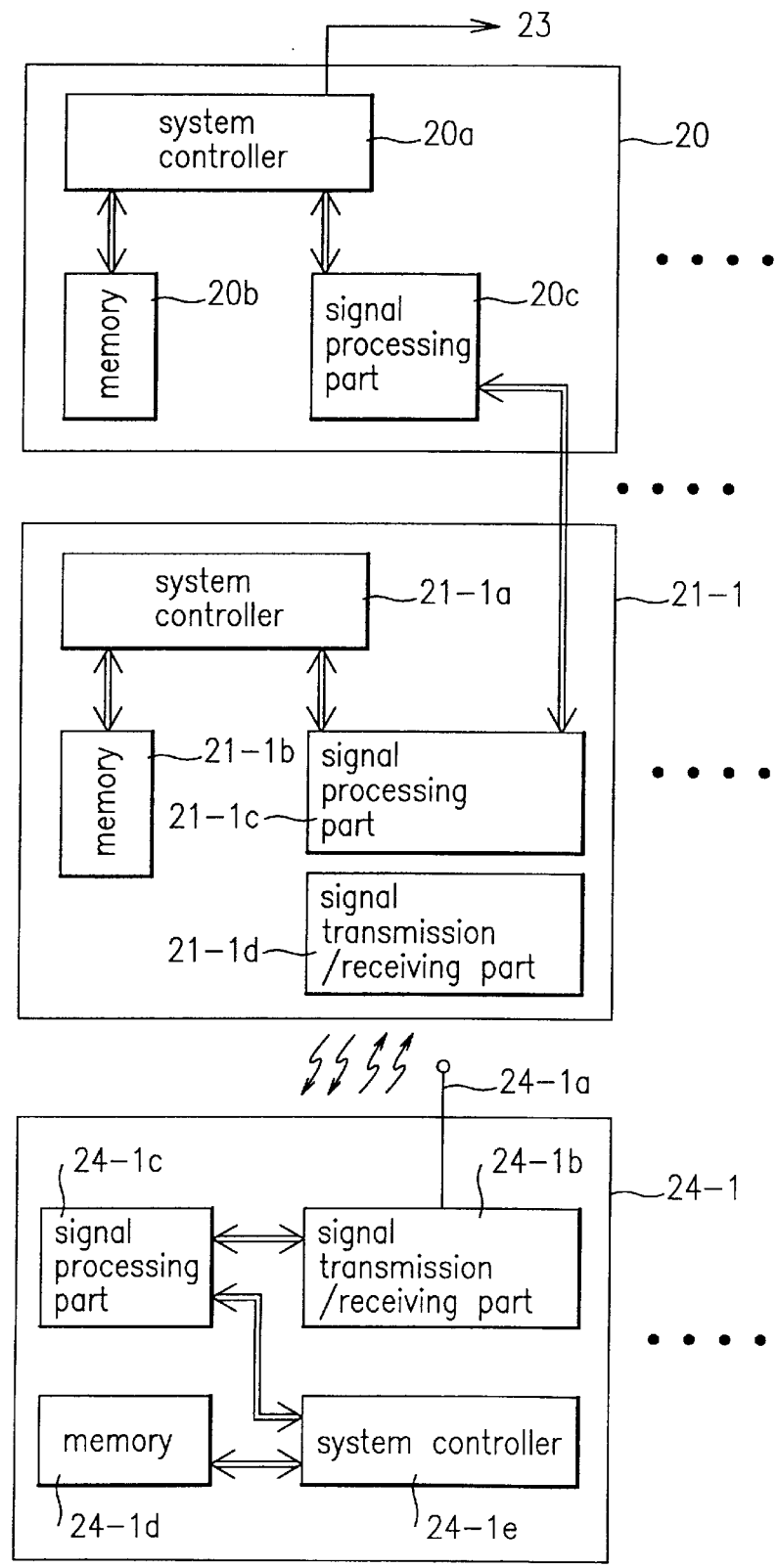
FIG. 3 is a block diagram illustrating a detailed construction of a repeater control unit, a repeater and a radio unit of FIG. 2.

On the other hand, in the case where the faulted primary control channel repeater of FIG. 2 has the highest channel number CH. N, the step S62 checks whether the control channel repeater 21-1 having the lowest channel number CH. 1 is operating normally.

If the control channel repeater 21-1 is in a fault state, it is checked at the steps S62 to S64 whether the next control channel repeaters 21-2, 21-3, . . . , 21-N are operating normally, until one control channel repeater operating normally is selected.

At the step S62, if the primary control channel repeater 21-3 designated in the radio unit 26-1 is in a fault state, the radio unit 26-1 checks whether the control channel repeater 21-2 having the lower channel number than the faulted primary control channel repeater 21-3 between the adjacent control channel repeaters 21-2 and 21-4 to the faulted primary control channel repeater 21-3 is operating normally. If the control channel repeater 21-2 having the lower channel number than the faulted primary control channel repeater 21-3 is in a fault state, it is checked at the steps S62 to S64 whether the next control channel repeater 21-1 is operating normally, until one control channel repeater operating normally is selected. Thereafter, if a normally operating control channel repeater is selected, and the forward signal is received from the selected control channel repeater, the system program returns to the step S57 for the communication service through the control channel repeater.

If the fault primary control channel repeater 21-1 of FIG. 2 has the lowest channel number CH. 1, the step S62 checks whether the control channel 21-N having the highest channel number CH. N, is normally operating. If the control channel repeater 21-N is in a fault state, it is checked at steps S62 to S64 whether the next lower control channel repeaters 21-N-1, . . . , 21-1 are operating normally, until one available control channel is selected.

Meanwhile, after the forward signal is received from the primary control channel repeater corresponding to the radio unit at step S53, if the acknowledging message for the location registration request signal is not received from the primary control channel repeater at step S55, the radio unit determines that the primary control channel repeater is in a fault state. Then, the system program advances to step S62 to check the operation states of other control channel repeaters.

When the forward signal is received from the currently used control channel repeater, the radio unit checks whether the previously designated primary control channel is available at the step S60. If not available, the system program returns to the step S57 to continually execute the communication service through the currently used control channel repeater. However, if available, the system program advances to the step S61 to check whether the currently used control channel corresponds to the available primary control channel. At the step S61 if it is checked that the currently used control channel does not correspond to the primary control channel being available, it is determined that the primary control channel repeater is repaired and the system program returns to the step S52 to check the operation state of the primary control channel repeater.

During a time when the control channel of repeater 21-2 is used as the primary control channel because the previously designated primary control channel of repeater 211 is in a fault state, if the faulted primary control channel repeater 21-1 is repaired by a system manager, then the control channel repeater 21-2 sends a forward signal to inform the radio unit group 24 that the faulted primary control channel repeater 21-1 has been repaired. When the radio unit group 24 receives the forward signal from the control channel repeater 21-2, the radio unit group 24 executes the communication by using the repaired primary control channel of repeater 21-1 through steps S52 to S61. However, since the forward signal is sent during a substantially short time period (for example, for several seconds), the radio unit 24-1 can not receive the forward signal if the radio unit 24-1 is powered off. However, when the radio unit 24-1 is again powered on, the radio unit 24-1 sends the location registration request signal to the control channel repeater 21-2. Then, the control channel repeater 21-2 sends to the radio unit 24-1 the channel number of the repeater being currently used, the total number of control channels and the fixed channel number of each control channel, including the acknowledging message, in response to the location registration request signal. The radio unit 24-1 receives the information and then checks that the primary control channel repeater 21-1 has returned to the normal operation state, to thereby execute the communication service through the primary control channel repeater 21-1.

As clearly apparent from the foregoing, a method for selecting a control channel in a trunked radio system according to the present invention has the following advantages: since an additional stand-by control channel repeater is not required, the production cost of the system can be reduced, the construction of the system can be made in a simple manner, and the maintenance of the system can be eased. In addition, even in the case where two or more control channel repeaters are in a fault state, a communication service can be continually executed.

It will be apparent to those skilled in the art that various modifications and variations can be made in a method for selecting a control channel in a trunked radio system of the present invention without departing from the spirit or scope of the invention. Thus, it is intended that the present invention cover the modifications and variations of this invention provided they come within the scope of the appended claims and their equivalents.

What is claimed is:

1. A method for selecting a plurality of control channels in a trunked radio system having said plurality of control channels and a plurality of radio unit groups corresponding to said control channels, said method comprising:

executing a communication by one radio unit group among said plurality of radio unit groups through a primary control channel of said control channels, as an active control channel;

executing the communication by said radio unit group through a secondary control channel of said control channels which are operating normally as the active control channel, when the primary control channel has a fault;

during the execution of the communication through the secondary control channel, switching the active control channel from the secondary channel to the primary control channel when the fault is removed from the primary control channel; and executing the communication by said radio unit group through the primary control channel when the primary control channel is operating normally.

2. A method for selecting control channels in a trunked radio system, said method comprising:

(a) executing a communication through a primary control channel;

(b) checking whether the primary control channel has a fault during execution of the communication;

(c) determining a secondary control channel that is operating normally when the primary control channel has a fault;

(d) executing the communication through the secondary control channel in place of the primary control channel;

(e) checking whether the primary control channel has a fault during execution of the communication through the secondary control channel; and (f) executing the communication through the primary control channel in place of the secondary control channel if the primary control channel is operating normally.

3. The method of claim 2, wherein the primary control channel is operating normally when it is repaired.

4. The method of claim 2, wherein said step (d) executes the communication through the secondary control channel that is initially acknowledged as operating normally.

5. The method of claim 2, wherein the primary and secondary control channels are selected from a group of control channels and said step (c) further comprises:

checking whether a control channel of the group having a higher channel number than said primary control channel is operating normally; and if the control channel having the higher channel number than said primary control channel has a fault, then checking whether the remaining control channels of the group are operating normally in an increasing channel number order until a control channel that is operating normally can be selected as the secondary control channel.

6. The method of claim 5, wherein said step (c) further comprises:

checking whether a control channel of the group having the lowest channel number is operating normally if the primary control channel has the highest channel number of the group; and checking whether the remaining control channels of the group are operating normally in an increasing channel number order until a control channel that is operating normally can be selected as the secondary control channel.

7. The method of claim 2, wherein the primary and secondary control channels are selected from a group of control channels, and said step (c) further comprises:

checking whether a control channel of the group having the lower channel number than said primary control channel is operating normally; and if the control channel having the lower channel number than said primary control channel has a fault, then checking whether the remaining control channels of the group are operating normally in a decreasing channel number order until a control channel that is operating normally can be selected as the secondary control channel.

8. The method of claim 7, wherein said step (c) further comprises:

checking whether a control channel of the group having the highest channel number is operating normally if the primary control channel has the lowest channel number of the group; and checking whether the remaining control channels of the group are operating normally in a decreasing channel number order until a control channel that is operating normally can be selected as the secondary control channel.

9. A method for selecting a control channel in a trunked radio system, comprising:

(a) receiving a forward signal from a primary control channel of a plurality of control channels within a first area;

(b) sending a location registration request signal on said primary control channel;

(c) receiving an acknowledging message and information on the control channels from said primary control channel;

(d) storing the information in a predetermined order;

(e) receiving another forward signal from one of the control channels;

(f) if the one of the control channels that carries the other forward signal is not the primary control channel, determining that the primary control channel is unavailable, and setting the one of the control channels as the active control channel; and (g) if the primary control channel becomes available, setting the primary control channel as the active control channel;

(h) executing a communication through the active control channel.

10. The method of claim 9, further comprising determining that the primary control channel is unavailable when the acknowledging message and the information on the control channels are not received from the primary control channel.

11. The method of claim 9, wherein said other forward signal is received at a radio unit while said radio unit is in a stand-by state.

12. The method of claim 9, wherein said forward signal includes information of a current site number and a total number of the control channels.

13. The method of claim 9, further comprising determining that the primary control channel is unavailable if the other forward signal is not received from the primary control channel, and the other former signal is received within the first area.

14. The method of claim 9, wherein said predetermined order of storing the information is from the control channel having a low channel number to the control channel having a high channel number.

15. The method of claim 9, wherein said predetermined order of storing the information is from the control channel having a high channel number to the control channel having a low channel number.

16. The method as defined in claim 9, wherein said step (h) executes the communication through an initially acknowledged control channel which carried the forward signal.

17. The method of claim 10, further comprising checking a carrier of the second forward signal based on the stored information of the plurality of control channels.

18. The method of claim 17, wherein said information on the plurality of control channels includes a channel number of the one control channel, a total number of the control channels and a channel number of each control channel.

19. The method of claim 1, wherein the primary control channel is a previously designated control channel.

20. A method for selecting a control channel in a distribution control type trunked radio system having a plurality of repeaters, wherein each of a plurality of mobile station groups is assigned a corresponding primary control channel, said method comprising the steps of:

(a) receiving and storing, at the first mobile station group, a first control channel information provided from a first corresponding repeater through the primary control channel;

(b) checking, at the first mobile station group, an operating state of the primary control channel;

(c) searching, at the first mobile station group, an alternate control channel utilizing the first control channel information and registering a location of the first mobile station group in a second repeater corresponding to the alternate control channel is abnormal, wherein said alternate control channels are searched in the direction of either increasing or decreasing control channel number relative to the primary control channel number;

(d) receiving, at the first mobile station group, a response message from the second repeater, after the location of the first mobile station is registered, said response message including a second control channel information; and (e) receiving and storing, at the first mobile station group, the response message with the second control channel information.

21. The method of claim 20, wherein said step (c) includes the steps of:

checking whether the control channel having a higher channel number relative to the primary control channel when the primary control channel is normally operated; and checking whether the remaining control channels are normally operating in a higher channel number order until a control channel being normally operated is selected, if the control channel having the higher channel number is abnormal.

22. The method of claim 20, wherein said step (c) includes the steps of:

checking whether the control channel having a lower channel number relative to the primary control channel when the primary control channel is normally operated; and checking whether the remaining control channels are normally operated in a lower channel number order until a control channel being normally operated is selected, if the control channel having the lower channel number is abnormal.

23. The method of claim 20, further comprising:

executing the communication through an initially acknowledged control channel which receives the forward signal from said first radio unit group.

24. The method of claim 20, wherein the step (b) includes the steps of:

checking whether the first mobile station group receives the primary control channel provided from the first corresponding repeater; and checking whether a currently used control channel is equal to the primary control channel.

* * * * *